(12) United States Patent
Kostar et al.

(10) Patent No.: US 8,663,778 B2
(45) Date of Patent: Mar. 4, 2014

(54) PREFORMS, COMPOSITE COMPONENTS FORMED THEREWITH, AND PROCESSES THEREFOR

(75) Inventors: Timothy Daniel Kostar, Nashua, NH (US); Douglas Melton Carper, Trenton, OH (US); Suresh Subramanian, Mason, OH (US); James Dale Steible, Mason, OH (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 12/905,244

(22) Filed: Oct. 15, 2010

(65) Prior Publication Data

US 2011/0027525 A1 Feb. 3, 2011

Related U.S. Application Data

(62) Division of application No. 11/566,370, filed on Dec. 4, 2006, now Pat. No. 7,837,914.

(51) Int. Cl.
| | |
|---|---|
| *B32B 5/12* | (2006.01) |
| *C04B 35/00* | (2006.01) |
| *D03D 15/00* | (2006.01) |
| *D03D 25/00* | (2006.01) |

(52) U.S. Cl.
USPC ........... 428/117; 428/105; 428/111; 428/116; 428/293.7; 428/397; 442/205; 442/208; 87/1; 139/420 R

(58) Field of Classification Search
CPC .............................. D04H 3/002; D04H 3/018
USPC ................ 428/116, 114, 35.7, 325, 221, 222, 428/292.1, 293.4, 293.7, 294.1, 397, 399, 428/293.1, 298.1, 298.7, 188, 111, 181, 428/105; 264/137, 103, 29.2, 211.14, 264/210.8; 87/1, 7, 8, 13; 442/173, 175, 442/178, 187, 189, 192, 193, 195, 196, 442/203–209, 218, 277, 281; 139/420 R, 139/420 C See application file for complete search history.

(56) References Cited

U.S. PATENT DOCUMENTS

| | | | | |
|---|---|---|---|---|
| 4,090,002 | A * | 5/1978 | Rosenblum | 428/117 |
| 5,597,450 | A * | 1/1997 | Baker et al. | 139/383 A |
| 5,633,074 | A | 5/1997 | Muroi et al. | |
| 6,663,737 | B2 * | 12/2003 | Hsiao et al. | 442/195 |

FOREIGN PATENT DOCUMENTS

| | | |
|---|---|---|
| WO | WO92/00182 | 1/1992 |
| WO | WO 9200182 A1 * | 1/1992 |

* cited by examiner

*Primary Examiner* — David Sample
*Assistant Examiner* — Nicholas W Jordan
(74) *Attorney, Agent, or Firm* — William Scott Andes; Gary M. Hartman; Domenica N. S. Hartman

(57) ABSTRACT

A three-dimensional preform, composite components formed with the preform, and processes for producing the preform and composite materials. The three-dimensional preform includes first and second sets of tows containing filaments. Each tow of the first set has a predetermined polygonal cross-sectional shape and is embedded within a temporary matrix. The preform is fabricated from the first and second sets of tows, in which the second set of tows are transverse to the first set of tows, adjacent tows of the second set are spaced apart to define interstitial regions therebetween, and the polygonal cross-sectional shapes of the first set of tows are substantially congruent to the cross-sectional shapes of the interstitial regions so as to substantially fill the interstitial regions.

20 Claims, 1 Drawing Sheet

PREFORMS, COMPOSITE COMPONENTS FORMED THEREWITH, AND PROCESSES THEREFOR

CROSS REFERENCE TO RELATED APPLICATIONS

This is a division patent application of U.S. patent application Ser. No. 11/566,370, filed Dec. 4, 2006, now U.S. Pat. No. 7,837,914. The contents of this prior application are incorporated herein by reference.

STATEMENT REGARDING FEDERALLY SPONSORED RESEARCH

This invention was made with Government support under Agreement No. F33615-98-C-2893 awarded by the U.S. Department of the Air Force. The Government has certain rights in the invention.

BACKGROUND OF THE INVENTION

The present invention generally relates to composite materials and their related processes. More particularly, this invention is directed to processes of forming a three-dimensional textile preform whose structure can be more readily densified and uniformly infiltrated to yield a dense composite component.

Ceramic matrix composite (CMC) materials generally comprise a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications are silicon-based composites, such as silicon carbide (SiC) as the matrix and/or reinforcement material. As examples, SiC fibers (filaments) and tows (bundles of filaments) have been used as a reinforcement material for a variety of ceramic matrix materials, including SiC, TiC, $Si_3N_4$, and $Al_2O_3$.

Continuous fiber reinforced ceramic composite (CFCC) materials are a type of CMC that offers light weight, high strength, and high stiffness for a variety of high temperature load-bearing applications. A CFCC material is generally characterized by continuous fibers that may be arranged to form a unidirectional array of fibers, or bundled in tows that are arranged to form a unidirectional array of tows, or bundled in tows that are woven to form a two-dimensional fabric or woven, braided, etc., to form a three-dimensional fabric. Conventional textile patterns can be used to form a textile preform in which two or more sets of tows are interlaced. The terms "warp," "weft," and "bias" are commonly used to identify the orientation of tows relative to weaving processes, and the terms "axial" and "braider" are commonly used to identify the orientation of tows relative to braiding processes. Warp and axial tows are those that, during the fabrication of a preform, continuously pass through a weaving or braiding machine so as to be parallel to the process direction of the preform. Weft (or fill) and bias tows run transverse (perpendicular and oblique, respectively) to warp tows of a woven preform, and braider tows run transverse to the axial tows of a braided preform. Because weft, bias, and braider tows are interwoven with the warp and axial tows, the former group may be termed dynamic tows and the latter static or stationary tows in reference to the weaving and braiding processes. Because the dynamic tows are interlaced with the static tows, the static tows tend to be substantially straight. The individual tows may be coated with a debond interface, such as boron nitride (BN) or carbon, forming a weak interface coating that allows for debonding and matrix crack deflection between the tows and the ceramic matrix material. As cracks develop in the CMC, one or more fibers bridging the crack act to redistribute the load to adjacent fibers and regions of the matrix material, thus inhibiting or at least slowing further propagation of the crack.

CMC components having complex shapes and those subject to high mechanical and thermal loads typically require a tailored three-dimensional fiber preform architecture that is densified with a ceramic matrix material, such as by infiltrating the preform with the desired matrix material (or a precursor thereof) to fill the porosity within the preform. Conventional three-dimensional preform fabrication processes (such as braiding, weaving, etc.) utilize dry or lightly sized tow whose brittle ceramic filaments can suffer damage from the fabrication process. For those CMC components requiring preforms with large tow size (high filament counts) to obtain desired part dimensions, three-dimensional preform fabrication processes do not allow for direct control of "filament packing" within the tows or shaping of the tow cross-sections to obtain optimized fiber weighting. The requirement or use of large tow sizes, in conjunction with the abrasive nature of the textile preforming process, can lead to filament breakage during preform fabrication and difficulties in matrix infiltration during composite densification, both of which can negatively affect the mechanical and physical properties of the CMC. To compensate for this, state of the art preform fabrication methods often employ both a lightly sized tow to reduce filament breakage during preforming, and an arbitrarily set limit on size of tow or filament count to aid in proper matrix infiltration. Prior CMC work has indicated that a key to obtaining good fiber coating and composite properties is related to spreading of the fibers inside the tows of two-dimensional fabrics used to form a CMC preform. For two-dimensional fabrics, this has been achieved by using mechanical and ultrasonic fluffing techniques. However, such techniques are not effective for three-dimensional fabrics.

In view of the above, it would be desirable if a process were available by which tow shape and filament packing within tows can be more readily predetermined and controlled while also providing for protection of the tow filaments during the preform fabrication process.

BRIEF DESCRIPTION OF THE INVENTION

The present invention provides a preform, composite components formed with the preform, and processes capable of producing the preform and the composite materials, particularly CMC components, to have desirable properties as a result of enabling improved control over tow shape and tow filament packing and minimizing damage to the tows and tow filaments during the preform fabrication process.

According to a first aspect of the invention, a preform is produced by a process that includes producing first and second sets of tows, in which each tow contains a plurality of substantially parallel filaments. In addition, each tow of the first set has a predetermined polygonal cross-sectional shape and is embedded within a temporary matrix. The three-dimensional preform is then fabricated to comprise the first and second sets of tows, in which the tows of the second set are transverse to the tows of the first set, adjacent tows of the second set are spaced apart to define interstices therebetween having a polygonal cross-sectional shape, and the predetermined polygonal cross-sectional shapes of the tows of the first set are substantially congruent to the polygonal cross-sectional shapes of the interstices so as to substantially fill the interstices.

According to a second aspect of the invention, a preform comprises at least first and second set of tows. Each tow of the first set of tows contains a plurality of substantially parallel filaments, has a predetermined polygonal cross-sectional shape, and is embedded within a temporary matrix. Each tow of the second set of tows contains a plurality of substantially parallel filaments. The tows of the second set are transverse to the tows of the first set, adjacent tows of the second set are spaced apart to define interstitial regions therebetween having a polygonal cross-sectional shape, and the predetermined polygonal cross-sectional shapes of the tows of the first set are substantially congruent to the polygonal cross-sectional shapes of the interstitial regions so as to substantially fill the interstitial regions.

According to a third aspect of the invention, a gas turbine engine component comprising a matrix material reinforced with a three-dimensional preform. The three-dimensional preform includes at least first and second sets of tows. Each tow of the first set of tows contains a plurality of substantially parallel filaments and has a predetermined polygonal cross-sectional shape. Each tow of the second set of tows contains a plurality of substantially parallel filaments. The tows of the second set are transverse to the tows of the first set, adjacent tows of the second set are spaced apart to define interstitial regions therebetween having a polygonal cross-sectional shape, the predetermined polygonal cross-sectional shapes of the tows of the first set are substantially congruent to the polygonal cross-sectional shapes of the interstitial regions so as to define substantially uniform spacing between the first and second sets of tows, and the matrix material is within the spacing between the first and second sets of tows so that the preform is within the matrix material.

In view of the above, the temporary matrix on the first set of tows is able to provide improved control over the cross-sectional shapes of the tows, improve the filament packing within these tows, and minimize damage to the tows and tow filaments during the preform fabrication process, without negatively impacting the properties of the final composite component. According to a preferred aspect of the invention, the preform constructed and processed as described above can be heated to remove the temporary matrix on the first set of tows so as to yield substantially uniform spacing between the first and second sets of tows. Thereafter, the spacing between the first and second sets of tows can be infiltrated with a desired matrix material or a precursor of the matrix material to form an infiltrated preform body, and the infiltrated preform body heated to yield the composite component. According to another preferred aspect of the invention, the temporary matrix burns off during heating of the preform without leaving any amount of residue on the tows of the first set that would reduce the mechanical properties of the composite component.

Other objects and advantages of this invention will be better appreciated from the following detailed description.

DETAILED DESCRIPTION OF THE INVENTION

The present invention is generally applicable to composite materials, and particularly CMC materials suitable for components such as combustor components, high pressure turbine vanes, and other hot section airfoils and components of gas turbine engines. The invention also has application to other components, including advanced power generation steam turbines and various other equipment that can make use of CMC materials. Examples of CMC materials to which the invention pertains include those with a silicon carbide, silicon nitride, and/or silicon reinforcement material in a ceramic matrix of silicon carbide, silicon nitride and/or silicon, e.g., a SiC/SiC CMC, though the invention also applies to other types and combinations of CMC materials.

Figure 1:
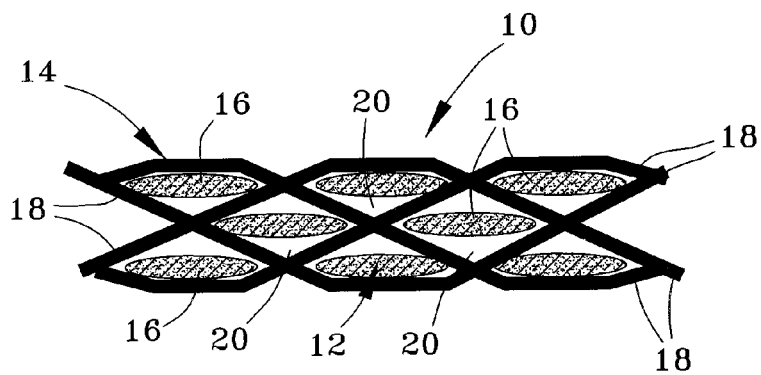
FIG. 1 schematically represents a fragmentary cross-sectional view of a three-dimensional fabric preform formed by transverse sets of tows in accordance with the prior art, and illustrates extensive and uncontrolled packing of filaments within static tows and inefficient filling of interstices between adjacent dynamic tows.

FIG. 1 schematically represents a fragmentary cross-sectional view of a three-dimensional fabric preform 10 of the prior art. The preform 10 comprises two transverse sets 12 and 14 of tows 16 and 18, respectively. The first set 12 of tows 16 is represented as being static tows, for example, the tows 16 are axial tows if the preform 10 has a braided architecture or warp tows if the preform 10 has a woven architecture. As such, the transverse tows 18 of the second set 14 are dynamic tows, for example, braided tows if the preform 10 has a braided architecture, or weft (fill) or bias tows if the preform 10 has a woven architecture. As conventional, the tows 16 and 18 are bundles made up of numerous parallel fibers or filaments (not shown), which as noted above may be formed of silicon carbide, silicon nitride, silicon, and/or another ceramic material. A notable commercial example is HI-NICALON® from Nippon Carbon Co., Ltd. Typical ranges for the diameters of the filaments are about eight to about twenty micrometers, though fibers with larger and smaller diameters are also possible. Typical fiber counts for the tows 16 and 18 are generally in the range of about 400 to about 800, and typical ranges for the diameters of the tows 16 and 18 are about 500 to about 2000 micrometers. However, these values are merely intended to be representative.

Because the filaments are formed from a relatively rigid ceramic material, the tows 16 and 18 are also rigid and do not readily deform, with the result that the filaments are prone to breakage and the tows 16 and 18 are prone to damage during the fabrication of the preform 10, during which the dynamic tows 18 are interlaced with the static tows 16. Furthermore, in typical weaving and braiding machines with limited numbers of available weaving positions, the packing of filaments within the tows 16 and 18 is not well controlled and can be excessive, particularly in the case of three-dimensional weaving and braiding. In the past, preform fabricators have resorted to using groups of tows in each position to create larger parts, which results in larger and typically polygonal-shaped interstitial regions 20 between adjacent dynamic tows 18. The fabricators must then try to fill each interstitial region 20 with a round or elliptical tow 16, which cannot be efficiently done as evident from FIG. 1. Additionally, the tows 16 and 18 are generally under some amount of tensioning during weaving and braiding operations, resulting in tightening of the tows 16 and 18 that can further aggravate the segregation of reinforced and unreinforced regions, and may result in higher than desired fiber volumes. From FIG. 1, it can be appreciated that the tows 16 and 18 may sustain damage where they are forced into contact with each other during the preform fabrication process.

Figure 2:
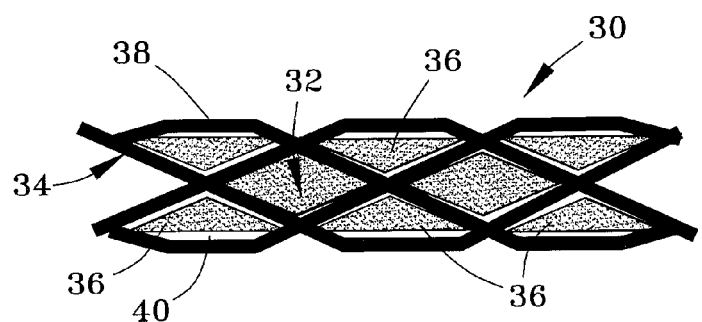
FIG. 2 schematically represents a fragmentary cross-sectional view of a fabric preform similar to that of FIG. 1, but in which the static tows are preshaped to have controlled filament packing, are embedded in a protective temporary matrix material, and have cross-sections optimized to fill interstices between adjacent dynamic tows in accordance with the present invention.

FIG. 2 schematically represents a fragmentary cross-sectional view of a fabric preform 30 similar to the preform 10 of FIG. 1. For example, the preform 30 depicted in FIG. 2 can have a braided or woven three-dimensional architect, in which a set 34 of dynamic tows 38 are interlaced with a set 32 of substantially straight static tows 36. According to a preferred aspect of the invention, a fundamental difference between the preforms 10 and 30 is that the static tows 36 of the latter are preshaped to achieve controlled filament packing and have cross-section shapes optimized to fill the interstitial regions 40 between adjacent dynamic tows 38. As previously discussed, suitable materials for the filaments within the tows 36 and 38 include silicon carbide, silicon nitride, silicon, and/or another ceramic material, such as the above-noted HI-NICALON®, and suitable diameters for the filaments are about eight to about twenty micrometers, though fibers with larger and smaller diameters are also possible. Furthermore, with respect to the dynamic tows 38, filament counts and tow diameters can be similar to that described for FIG. 1. Potential and necessary differences between the static and dynamic tows 36 and 38 will be evident from the following discussion.

Figure 3:
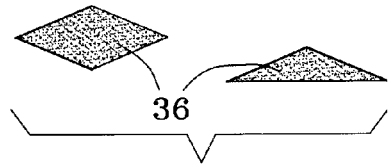
FIG. 3 schematically represents two different cross-sectional shapes for dynamic tows shown in FIG. 2.

FIGS. 2 and 3 represent each static tow 36 as having a cross-sectional shape that is substantially congruent to the cross-sectional shape of the interstitial region 40 in which the tow 36 is located, preferably so that the shaped static tow 36 fills or nearly fills the entire interstitial region 40 in which it is located. As a result, the shaped static tows 36 more efficiently fill the interstitial regions 40 than do the round or elliptical tows 16 of FIG. 1. For example, the static tows 36 preferably fill at least 80% of the cross-sectional area of each interstitial region 40. While diamond and triangular-shaped static tows 36 are represented in FIGS. 2 and 3, other cross-sectional shapes are also within the scope of this invention, particularly other polygonal shapes that are congruent to the cross-sectional shapes of the interstitial regions 40 to be filled.

To obtain a predefined cross-sectional shape, the static tows 36 are preferably prefabricated, for example, in the form of a composite rod stock or a heavily sized tow, by which a bundle of filaments are impregnated or otherwise embedded in a temporary matrix material. If the former, the tows 36 can be fabricated by a pultrusion process. For example, loose filaments are impregnated with the matrix material, enter a die, and exit as a cured rod stock, all while being continuously pulled through the die. The die preferably maintains filament alignment, controllably compresses the filaments to a desired volume fraction, and cures the matrix material in a relatively short period of time without damaging the filaments. If in the form of a heavily sized tow, the static tows 36 can be fabricated in a manner similar to the static tows 16 of FIG. 1, but using a sizing material as the temporary matrix material for the filaments. In other words, each tow 36 is effectively impregnated with the matrix material that surrounds the filaments within the tow 36.

The temporary matrix material of the tows 36 is not intended to remain as a permanent constituent of the final CMC material, but instead is removed prior to infiltration with the permanent matrix material (or its precursor) desired for the CMC material. For this reason, suitable temporary matrix materials for the static tows 36 include materials that can be cleanly and completely removed, such as low char-yield polymers capable of being burned-off by heating to temperatures that can be sustained by the tows 36 and 38 without damage. Most epoxies are believed to be acceptable, as are polyvinyl alcohol (PVA) and other materials that leave little or no carbon char residue when heated to suitable burn-off temperatures, for example, about 700° C. to about 750° C.

Figure 4:
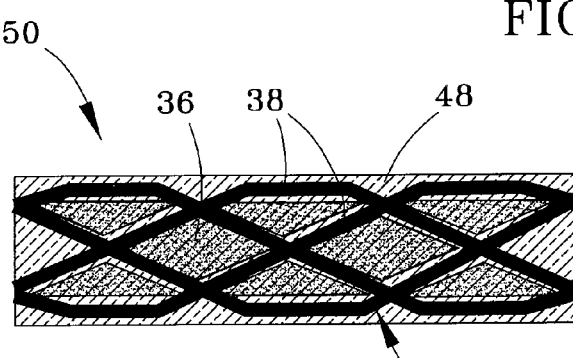
FIG. 4 schematically represents the preform of FIG. 2 infiltrated with a matrix material to form a ceramic matrix composite component.

During fabrication of the static tows 36, the amount of temporary matrix material impregnated into the tows 36 can be tailored to achieve a desired volume fraction of the filaments within the tows 36 (for example, about 20% to about 40%), corresponding to tow packing fraction or spacing of filaments within a conventional tow such as the static tows 16 of FIG. 1. The temporary matrix material for the static tows 36 also has the benefit of protecting the brittle filaments within the static tows 36 during fabrication of the preform 30, as well as the filaments of the dynamic tows 38 that contact the static tows 36 during or after the preform fabrication process. During prefabrication of the static tows 36, the amount of matrix material present at the exterior surface of each tow 36 can also be tailored to promote a predetermined cross-sectional shape for the tow 36. Following burn-off of the matrix material, only the controllably-packed filaments of the static tows 36 remain, with the result that the spacing between the tows 36 and 38 may be slightly though uniformly increased. As a result, infiltration of the preform 30 during composite densification with the ceramic matrix material or its precursor is greatly enhanced, thus providing the capability of also greatly enhancing the properties of the final CMC component and reducing material scrap rates. Various infiltration techniques can be used for this final step, a notable example of which is chemical vapor infiltration (CVI) to penetrate the small gaps between the tows 36 and 38. Matrix infiltration by melt infiltration (MI) can also be used, for example, by slurry cast-MI or resin transfer molding (RTM) with a resinous slurry followed by MI. Such infiltration techniques are well known in the art and therefore do not need further explanation. FIG. 4 schematically represents the completion of this step, in which the preform 30 of FIG. 2 is shown as infiltrated with a ceramic matrix material 48 to yield a CMC component 50.

While the invention has been described in terms of particular embodiments, it is apparent that other forms could be adopted by one skilled in the art. Therefore, the scope of the invention is to be limited only by the following claims.

The invention claimed is:

1. A three-dimensional preform produced by a process comprising the steps of:
   producing a first set of tows in which each tow contains a plurality of substantially parallel filaments embedded within a temporary matrix, the tows of the first set comprising first tows and second tows having predetermined cross-sectional shapes that differ from each other;
   producing at least a second set of tows in which each tow contains a plurality of substantially parallel filaments; and then
   fabricating the three-dimensional preform to comprise the first and second sets of tows, in which the tows of the second set are transverse to the tows of the first set, the tows of the first set are substantially straight, the tows of the second set are interlaced with the tows of the first set to define interstitial regions that have different cross-sectional shapes and are each between adjacent tows of the second set, the tows of the first set are within the interstitial regions, and the predetermined cross-sectional shapes of the first tows of the first set are substantially congruent to a first of the different cross-sectional shapes of the interstitial regions and the predetermined cross-sectional shapes of the second tows of the first set are substantially congruent to a second of the different cross-sectional shapes of the interstitial regions that is different from the first of the different cross-sectional shapes of the interstitial regions so that the first and second tows of the first set substantially fill the interstitial regions.

2. The three-dimensional preform according to claim 1, wherein the filaments are ceramic materials.

3. The three-dimensional preform according to claim 1, wherein the preform is fabricated such that the first set of tows are static tows and the second set of tows are dynamic tows of the preform.

4. The three-dimensional preform according to claim 1, wherein the predetermined cross-sectional shapes of the interstitial regions and of the tows of the first set are polygonal.

5. The three-dimensional preform according to claim 1, wherein the preform has a woven architecture.

6. The three-dimensional preform according to claim 1, wherein the preform has a braided architecture.

7. The three-dimensional preform according to claim 1, wherein the tows of the first set are produced by a pultrusion process.

8. The three-dimensional preform according to claim 1, wherein the tows of the first set are produced by a process during which the tows of the first set are impregnated with the temporary matrix.

9. The three-dimensional preform according to claim 1, wherein the predetermined cross-sectional shapes of the first and second tows of the first set are, respectively, diamond and triangular shapes.

10. A composite component comprising a matrix material reinforced with the three-dimensional preform produced by the process according to claim 1, the composite component being produced by a process comprising the steps of:
heating the preform to remove the temporary matrix on the first set of tows so as to yield substantially uniform spacing between the first and second sets of tows; and then
infiltrating the spacing between the first and second sets of tows to form the composite component and so that the preform is within the matrix material.

11. The composite component according to claim 10 wherein, during the heating of the preform, the temporary matrix burns off without leaving any amount of residue on the tows of the first set that would reduce the mechanical properties of the composite component.

12. The composite component according to claim 10, wherein the component is a ceramic matrix composite component of a gas turbine engine.

13. A three-dimensional preform comprising:
a first set of tows in which each tow contains a plurality of substantially parallel filaments embedded within a temporary matrix, the tows of the first set comprising first tows and second tows having predetermined cross-sectional shapes that differ from each other;
at least a second set of tows in which each tow contains a plurality of substantially parallel filaments;
wherein the tows of the second set are transverse to the tows of the first set, the tows of the first set are substantially straight, the tows of the second set are interlaced with the tows of the first set to define interstitial regions that have different cross-sectional shapes and are each between adjacent tows of the second set, the tows of the first set are within the interstitial regions, and the predetermined cross-sectional shapes of the first tows of the first set are substantially congruent to a first of the different cross-sectional shapes of the interstitial regions and the predetermined cross-sectional shapes of the second tows of the first set are substantially congruent to a second of the different cross-sectional shapes of the interstitial regions that is different from the first of the different cross-sectional shapes of the interstitial regions so that the first and second tows of the first set substantially fill the interstitial regions.

14. The three-dimensional preform according to claim 13, wherein the filaments are ceramic materials.

15. The three-dimensional preform according to claim 13, wherein the first set of tows are static tows and the second set of tows are dynamic tows of the preform.

16. The three-dimensional preform according to claim 13, wherein the predetermined cross-sectional shapes of the interstitial regions and of the tows of the first set are polygonal.

17. The three-dimensional preform according to claim 13, wherein the preform has an architecture chosen from the group consisting of woven architectures and braided architectures.

18. The three-dimensional preform according to claim 13, wherein the predetermined cross-sectional shapes of the first and second tows of the first set are, respectively, diamond and triangular shapes.

19. A gas turbine engine component comprising a matrix material reinforced with the three-dimensional preform according to claim 13, the component being produced by a process comprising the steps of:
heating the preform to remove the temporary matrix on the first set of tows so as to yield substantially uniform spacing between the first and second sets of tows; and then
infiltrating the spacing between the first and second sets of tows to form the component and so that the preform is within the matrix material.

20. A gas turbine engine component comprising a ceramic matrix material reinforced with a three-dimensional preform, the three-dimensional preform comprising:
a first set of tows in which each tow contains a plurality of substantially parallel filaments, the tows of the first set comprising first tows and second tows having predetermined cross-sectional shapes that differ from each other; and
at least a second set of tows in which each tow contains a plurality of substantially parallel filaments;
wherein the tows of the second set are transverse to the tows of the first set, the tows of the first set are substantially straight, the tows of the second set are interlaced with the tows of the first set to define interstitial regions that have different cross-sectional shapes and are each between adjacent tows of the second set, the tows of the first set are within the interstitial regions, the predetermined cross-sectional shapes of the first tows of the first set are substantially congruent to a first of the different cross-sectional shapes of the interstitial regions, and the predetermined cross-sectional shapes of the second tows of the first set are substantially congruent to a second of the different cross-sectional shapes of the interstitial regions that is different from the first of the different cross-sectional shapes of the interstitial regions so that the first and second tows of the first set substantially fill the interstitial regions, and the ceramic matrix material is within the interstitial regions between the first and second sets of tows so that the preform is within the ceramic matrix material.

* * * * *